United States Patent
Schmidt et al.

(10) Patent No.: US 11,253,965 B2
(45) Date of Patent: Feb. 22, 2022

(54) SUPPORTING A WORKPIECE ON SUPPORT SLATS OF A WORKPIECE SUPPORT

(71) Applicant: TRUMPF Sachsen GmbH, Neukirch (DE)

(72) Inventors: Andreas Schmidt, Hochkirch (DE); Hans-Georg Zenker, Neukirch/Lausitz (DE); Harry Thonig, Neukirch/Lausitz (DE)

(73) Assignee: TRUMPF Sachsen GmbH, Neukirch (DE)

( * ) Notice: Subject to any disclaimer, the term of this patent is extended or adjusted under 35 U.S.C. 154(b) by 250 days.

(21) Appl. No.: 16/538,889

(22) Filed: Aug. 13, 2019

(65) Prior Publication Data
US 2020/0047297 A1    Feb. 13, 2020

(30) Foreign Application Priority Data
Aug. 13, 2018  (DE) .......................... 102018213579.7

(51) Int. Cl.
*B23Q 1/03* (2006.01)
*B23K 26/70* (2014.01)
*B23K 37/04* (2006.01)

(52) U.S. Cl.
CPC .............. *B23Q 1/03* (2013.01); *B23K 26/702* (2015.10); *B23K 37/0408* (2013.01)

(58) Field of Classification Search
CPC ..... B23Q 1/03; B23K 37/0408; B23K 26/702
See application file for complete search history.

(56) References Cited

U.S. PATENT DOCUMENTS 4,058,299 A * 11/1977 Lindkvist ................ B08B 15/04
                                                                 266/48
5,167,903 A * 12/1992 Anderson ................ B23K 7/10
                                                                 266/49

(Continued)

FOREIGN PATENT DOCUMENTS

| CH | 626678 A5 | 11/1981 |
|----|-----------|---------|
| JP | H08-132228 | 5/1996 |
| WO | WO 2007/134630 | 11/2007 |

OTHER PUBLICATIONS

DE Office Action in German Appln. No. 10 2018 213 579.7, dated Aug. 2, 2019, 18 pages (with English translation).

*Primary Examiner* — Tyrone V Hall, Jr.
(74) *Attorney, Agent, or Firm* — Fish & Richardson P.C.

(57) ABSTRACT

Methods and devices for supporting a workpiece on support slats of a workpiece support during machining of the workpiece by thermal separation by a separation beam directed onto the workpiece are provided. In one aspect, a support slat includes support projections on a workpiece side extending in a longitudinal direction of the support slat. The support projections follow one after another in the longitudinal direction at a mutual distance to form projection gaps. On an underside of at least one support projection remote from the workpiece side, the support slat defines a recess covered by the support projection toward the workpiece side. The recess extends in a transverse direction of the support slat. The support projection covering the recess is separably connected to the rest of the support slat and is separable from the support slat with opening the recess toward the workpiece side.

9 Claims, 3 Drawing Sheets

(56) References Cited

U.S. PATENT DOCUMENTS

2004/0144762 A1* 7/2004 Franz .................. B23K 26/702
                                                  219/121.82
2014/0191459 A1* 7/2014 Fox ..................... B23K 26/702
                                                    269/287

* cited by examiner

SUPPORTING A WORKPIECE ON SUPPORT SLATS OF A WORKPIECE SUPPORT

CROSS REFERENCE TO RELATED APPLICATION

This application claims priority under 35 U.S.C. § 119 from German Application No. DE 10 2018 213 579.7, filed on Aug. 13, 2018, the entire contents of which is incorporated herein by reference.

TECHNICAL FIELD

The invention relates to devices for supporting a workpiece, including a support slat and a workpiece support, methods for producing such support slat and workpiece support, and methods for machining a workpiece.

BACKGROUND

During thermally separative machining by means of a separation beam, workpieces such as metal sheets are supported on a workpiece support, for example in plasma or laser cutting, which workpiece support comprises a plurality of support slats arranged side by side and mostly extending in parallel with one another. The support slats are provided with support tips spaced apart from one another in the longitudinal direction of the support slats, on which tips the relevant workpiece is supported at points during machining. If a workpiece is machined in the region of a support tip, there is the risk, despite the support of the workpiece at points on the support tip, that material of the workpiece melted due to machining and/or slag formed due to machining deposits on the support tip and causes caking of the workpiece on the workpiece support. Such caking makes it more difficult to unload the workpiece from the workpiece support after the separative machining. In addition, caking of the kind described impairs the quality of the machined workpiece. A reduction in the quality of the machining product may also be caused by the separation beam being reflected toward the underside of the workpiece after penetrating the workpiece.

In order to avoid the above-mentioned hindrance of the machining sequence during thermal separation by means of a separation beam and to ensure high-quality machining, according to WO 2007/134630 A1 a workpiece support is configured prior to separative workpiece machining, by breaking off or bending triangular support tips on the support slats of the workpiece support, which tips would be arranged at a machining position of the separation beam during subsequent workpiece machining. For this purpose, in the case of the prior art a laser cutting machine is provided with an adjustment device on a gate of the housing of the working space thereof, the workpiece support, which is not yet loaded, passing beneath this adjustment device before cutting workpiece machining. At the support slats of the workpiece support, the support tips project toward the adjustment device. Stop elements of the adjustment device can be positioned, perpendicularly with respect to the support plane formed by the workpiece support, into a stop position or into a retracted position. During the movement carried out by the workpiece support relative to the adjustment device, the support tips on the support slats of the workpiece support pass a stop element of the adjustment device put into the retracted position without collision, whereas a stop element transferred into the stop position projects into the movement path of the support tips and support tips which collide with the stop element due to the movement of the workpiece support are broken off or bent. The position of the stop elements of the adjusting device is set depending on the subsequent cutting process such that the support tips of the workpiece support that would be below or in the immediate vicinity of the point of impact of the laser cutting beam on the workpiece during subsequent workpiece machining are removed or bent.

SUMMARY

One object of the present invention is to provide, with minimum manufacturing effort, a workpiece support which is adapted to a specific separation process and which is particularly suitable for avoiding disruption of the separation process and quality losses at the separatively machined workpiece.

One aspect of the invention features a support slat for supporting a workpiece during machining of the workpiece by thermal separation by means of a separation beam directed onto the workpiece. The support slat has a workpiece side which extends in a longitudinal direction of the support slat and has support projections following one after the other in the longitudinal direction of the support slat at a mutual distance so as to form projection gaps.

The support slat has, below at least one support projection in the transverse direction of the support slat, preferably below several or all support projections, a recess covered by the support projection in the initial state of the support slat and extending in the transverse direction of the support slat. With respect to any adjacent projection gaps, the recess covered by the support projection is offset toward the side of the support slat remote from the workpiece side. By separative machining of the support slat, the recess can be opened toward the workpiece side. A laser cutting beam is preferably used for separative machining within the scope of the invention.

Another aspect of the invention features a method for producing a support slat of the above-mentioned kind, in which a plate-like workpiece strip is provided, on a side extending in a longitudinal direction of the workpiece strip, with support projections and projection gaps by means of separative machining, which projections and gaps follow one after the other in the longitudinal direction of the workpiece strip.

During production of the support slat, a plate-like workpiece strip, preferably a metal-sheet strip, is separatively machined in a conventional manner, in particular cut by means of a laser cutting beam. On the workpiece strip, the relevant workpiece regions are separated to produce the support projections and the recesses on the underside of the support projections.

A further aspect of the invention features a method for producing a workpiece support for supporting a workpiece during subsequent workpiece machining by thermal separation by means of a separation beam directed onto the workpiece with relative movement of the workpiece and of the separation beam in the transverse direction of the separation beam and associated transferal of the separation beam into at least one machining position. A bearing structure provided for the workpiece support is equipped with a plurality of support slats such that the support slats are spaced apart from one another perpendicularly with respect to longitudinal planes of the support slats, which longitudinal planes are spanned by a longitudinal direction and a transverse direction of the support slats extending perpendicularly with respect to the longitudinal direction and at least one support projection of at least one support slat arranged at a machining position of the separation beam being separated from the entity of the support slat by separative machining of the support slat.

The method for machining workpieces is taken into account in the production of a workpiece support according to the invention insofar as the positions assumed by the separation beam in the subsequent workpiece machining with respect to the workpiece support, and optionally the path along which the separation beam travels during the later separation process on the workpiece support, are known at the time of production of a workpiece support according to the invention. The machining positions of the separation beam during workpiece machining following the production of the workpiece support are stored in a numerical machine control system, which is preferably used during production of the workpiece support in order to control the separative machining of the support slats.

In order to produce the workpiece support, the support projection(s) which would then oppose the separation beam on the underside of the workpiece or be passed over by the separation beam during separative workpiece machining are removed from the relevant support slat(s). After removal of the support projections, the recesses arranged on the underside of the support projections are accessible on the support slats from the workpiece side. The recesses extend in the transverse direction of a support slat beyond any adjacent projection gaps.

During the workpiece machining following production of the workpiece support, the now opened recesses can accommodate the separation beam and/or material melt and slag produced during separative workpiece machining and thereby keep said beam and/or material melt and slag away from the workpiece, in particular from the workpiece underside, and also from the surrounding support projections. As a result, contamination of the workpiece and the separation beam reflected at the support slats being applied to the workpiece underside in an undesirable manner are also prevented, as well as caking of the workpiece on the remaining support projections of the workpiece support according to the invention.

A connecting part remaining on a support slat between a support projection and the edge of the recess covered by the support projection can, if required, be separated from the entity of the support slat in order to adapt the support slat and the workpiece support provided with the support slat to a specific machining task in a functionally reliable manner.

If a recess on the underside of a support projection of a support slat has an inclined recess wall such that the recess widens toward the workpiece side of the support slat, this ensures that the separation beam dipping into the recess during machining of a workpiece supported on the support slat and/or any material melt or slag discharged from the workpiece side into the recess is not reflected toward the underside of the workpiece that is supported by the remaining support projections.

In this context, recesses on the support slats which have, in a longitudinal plane of the support slat spanned by the longitudinal direction and the transverse direction of the support slat, a triangular shape that widens towards the workpiece side of the support slat are particularly effective.

In particular for machining tasks in the context of which workpieces having low inherent stiffness, such as thin metal sheets, must be supported, support slats are provided with support projections which form a two-dimensional workpiece support.

Effective workpiece support is ensured in a further development in that the support projections and projection gaps following one after the other in the longitudinal direction of the support slats at a mutual distance have a rectangular shape in a longitudinal plane of the support slat spanned by the longitudinal direction and the transverse direction of the support slat.

Particularly flexible adaptation of a support slat and of a workpiece support provided with the support slat to alternating machining tasks results in a particular embodiment. In two planes arranged one above the other in the transverse direction of the support slat, the support slat is provided on the one hand with a plurality of support profections and projection gaps following one after the other in the longitudinal direction of the support slat and on the other hand with a corresponding number of recesses that can be opened toward the work piece side as required by removing a support projection. Preferably, the support projections and projection gaps of the layer of the support slat on the workpiece side on the one hand and the recesses of the layer of the support slat remote from the workpiece on the other hand are each at the same level in the transverse direction of the support slat.

In a further embodiment, the support slat is formed in one piece and of uniform material, in particular for the purpose of the simplest possible production of the support slat. Metal-sheet parts are preferred as support slats.

During the workpiece machining following production of the support slats and the workpiece support, the separation beam can reach machining positions at points depending on the specific machining task, but can also be moved along a separation path produced as a sequence of machining positions at points. Within the context of a variant of the method according to the invention for producing a workpiece support, support projections are removed from support slats along a separation path of a workpiece machining operation in order to produce a recess contour.

Another aspect of the invention features a workpiece support for supporting a workpiece during workpiece machining by thermal separation by means of a separation beam directed onto the workpiece with relative movement of the workpiece and of the separation beam in the transverse direction of the separation beam and associated transferal of the separation beam into at least one machining position. The workpiece support has a bearing structure and a plurality of support slats provided on the bearing structure, which slats are spaced apart from one another perpendicularly with respect to longitudinal planes of the support slats, the longitudinal planes of the support slats being spanned by a longitudinal direction and a transverse direction of the support slats extending perpendicularly with respect to the longitudinal direction and the support slats having a workpiece side that extends in the longitudinal direction of the support slats and has support projections which follow one after the other at a mutual spacing in the longitudinal direction of the support slats with forming projection gaps.

A further aspect of the invention features a method for machining a workpiece by thermal separation by means of a separation beam directed onto the workpiece with relative movement of the workpiece and of the separation beam in the transverse direction of the separation beam and associated transferal of the separation beam into at least one machining position. A workpiece support for the workpiece to be machined is provided and the workpiece is supported on the workpiece support before the workpiece is separatively machined at the machining position(s) of the separation beam.

In a preferred embodiment of the method for machining a workpiece, the support slats are also produced in addition to the workpiece support, from which slats the workpiece support is produced.

In order to simplify the manufacturing process as far as possible, in a further preferred embodiment of the method for machining a workpiece, a machining device provided for carrying out the workpiece machining, such as the cutting unit of a laser cutting machine, is also used for separative machining during production of the workpiece support and/or for separative machining during production of support slats according to the invention.

DESCRIPTION OF DRAWINGS

The invention will be explained in more detail below with reference to schematic drawings, in which.

DETAILED DESCRIPTION

Figure 1:
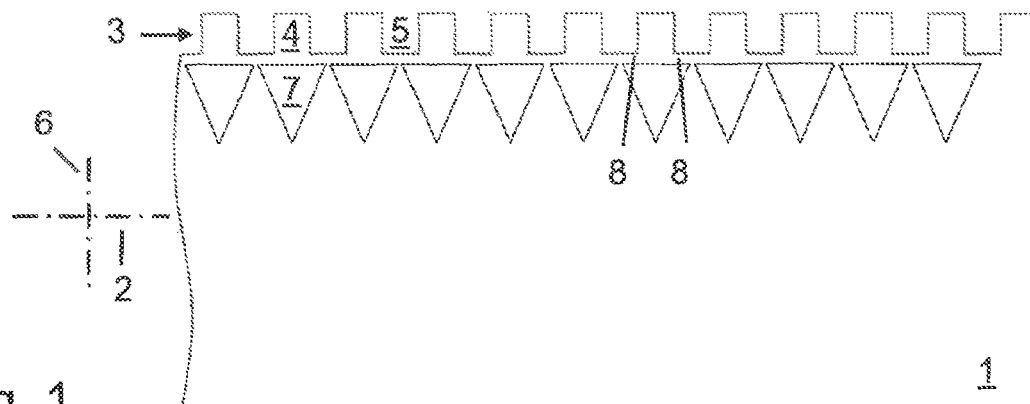
FIG. 1 shows a support slat for supporting a workpiece during machining by thermal separation in an initial state.

A support slat 1, a partial length of which is shown in FIG. 1, has a slat body and a plurality of support projections 4 extending from a workpiece side 3 of the slat body extending in a longitudinal direction 2, which support projections follow one after the other in the longitudinal direction 2 of the support slat 1 at a mutual distance so as to form projection gaps 5. In a longitudinal plane of the support slat 1 spanned by the longitudinal direction 2 and a transverse direction 6 of the support slat 1 that extends perpendicularly with respect to the longitudinal direction 2, the support projections 4 and the projection gaps 5 have a rectangular shape. The support slat 1 is formed as a one-piece metal-sheet part made of uniform material. Perpendicularly with respect to the plane of FIGS. 1-3, the support slat 1 has a thickness of 2 mm in the illustrated example.

On the workpiece side, each of the support projections 4 is delimited by a flat end face having a rectangular contour. The end faces of all the support projections 4 form a flat workpiece support surface that is interrupted by the projection gaps 5.

A recess 7 is provided on the underside of each support projection 4. The recesses 7 have, in the longitudinal plane of the support slat 1, a triangular shape widening toward the workpiece side 3. Similarly to the projection gaps 5, the recesses 7 penetrate the support slat 1 perpendicularly with respect to the longitudinal plane of the support slat 1.

The support projections 4 and the projection gaps 5 form a workpiece side layer of the support slat 1, and the recesses 7 form a layer of the support slat 1 remote from the workpiece. In the transverse direction 6 of the support slat 1, the support projections 4 and the projection gaps 5 on the one hand and the recesses 7 on the other hand are each at the same level. Similarly to the support projections 4 and the projection gaps 5, the recesses 7 of the support slat 1 are also uniform in terms of their geometry.

Toward the workpiece side 3, the recesses 7 are covered by the respective support projections 4 associated therewith. In the vertical projection in the transverse direction 6 of the support slat 1, the support projections 4 are arranged within the recesses 7. A connecting web 8 extends at each of both sides of a support projection 4 in the longitudinal direction 2, which connecting web reaches the edge of the recess 7 associated with the support projection 4. Each of the support projections 4 is connected to the rest of the support slat 1 via the two connecting webs 8.

Figure 2:
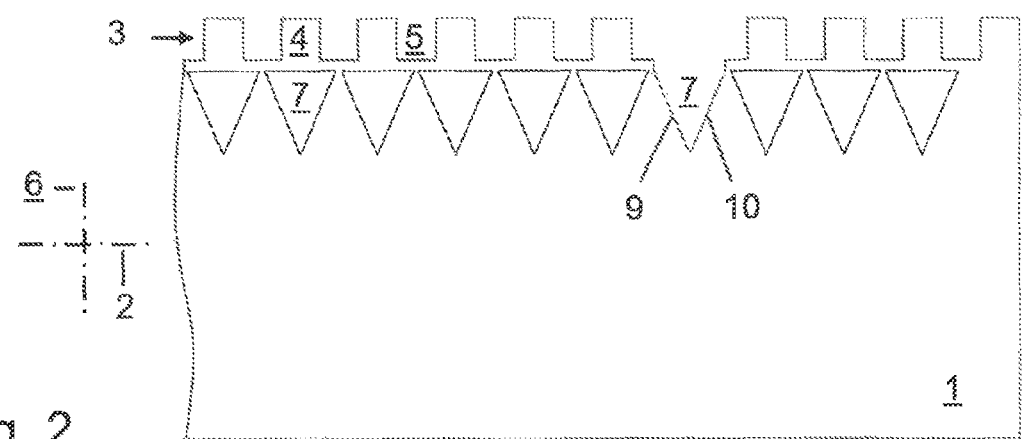
FIG. 2 shows the support slat according to FIG. 1 after adaptation to a specific machining task.

By means of thermally separative machining, described below in detail, of the support slat 1 in the initial state according to FIG. 1, the support slat 1 is adapted, if necessary, to specific subsequent workpiece machining. The support slat is shown in FIG. 2 in a state adapted to a specific machining task.

In order to modify the support slat 1 in the initial state, a support projection 4 is removed, at a defined point of the support slat 1, by separative machining of the connecting webs 8 between the support projection 4 and the rest of the support slat 1. The recess 7 previously covered by the support projection 4 toward the workpiece side 3 of the support slat 1 is opened toward the workpiece side 3 by the separation of the support projection 4 from the entity of the support slat 1. Recess walls 9, 10 formed on the triangular sides of the recess 7 extend at such an inclination with respect to the transverse direction 6 of the support slat 1 that the recess 7 widens toward the workpiece side 3 of the support slat 1.

Figure 3:
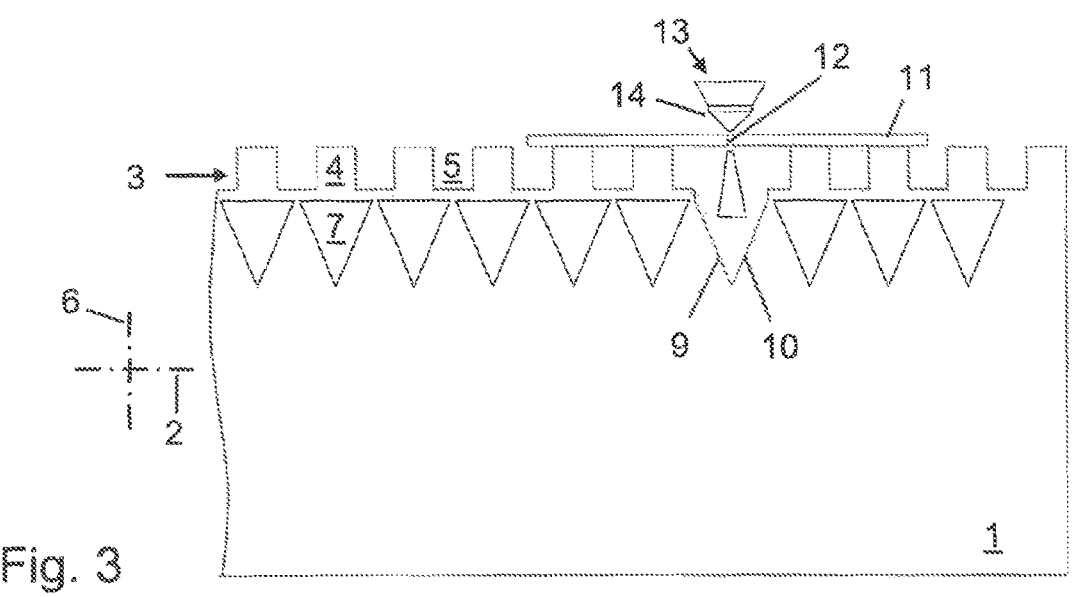
FIG. 3 shows the support slat according to FIG. 2 with a workpiece during machining of the workpiece by thermal separation.

As shown in FIG. 3, the support slat 1 is used to support a workpiece, in the illustrated example a metal sheet 11, during machining of the metal sheet 11 by thermal separation by means of a separation beam, in the present case by means of a laser cutting beam 12 shown in outlines. The laser cutting beam 12 widens below the metal sheet 11 in a conical manner.

During separative machining of the support slat 1 in the initial state, the support projection 4 of the support slat 1 which would have been passed over during the machining of the metal sheet 11 by a laser cutting head 13 provided as a conventional machining device has been removed. Only the laser nozzle 14 of the laser cutting head 13 can be seen in FIG. 3.

In the state shown in FIGS. 2 and 3, the support slat 1 still provides support for the metal sheet 11 over a large surface area despite the absence of an originally existing support projection 4. In the state according to FIGS. 2 and 3, the support slat 1 is therefore still able to support even workpieces having less inherent stiffness, such as thin sheets, with a defined flat shape.

Since the recess 7 that is open on the workpiece side is arranged below the machining position of the laser cutting beam 12 and extends, with respect to the projection gaps 5 that are adjacent in the longitudinal direction 2 of the support slat 1, in the transverse direction of the support slat 1 toward the side of the support slat 1 that is remote from the workpiece side 3, the laser cutting beam 12 can dip into the recess 7 without damaging the support slat 1. The laser cutting beam 12 is reflected toward the side from the inclined recess walls 9, 10. The reflected laser cutting beam 12 is therefore kept away from the underside of the metal sheet 11. In addition, material melt of the metal sheet 11 formed due to machining and slag produced due to machining enter the recess 7 that is open toward the workpiece side 3 of the support slat 1. The material melt and the slag are also deflected by the inclined recess walls 9, 10 such that they do not reach the underside of the metal sheet 11. In this way, high machining quality is ensured at the machined metal sheet 11.

Figure 6:
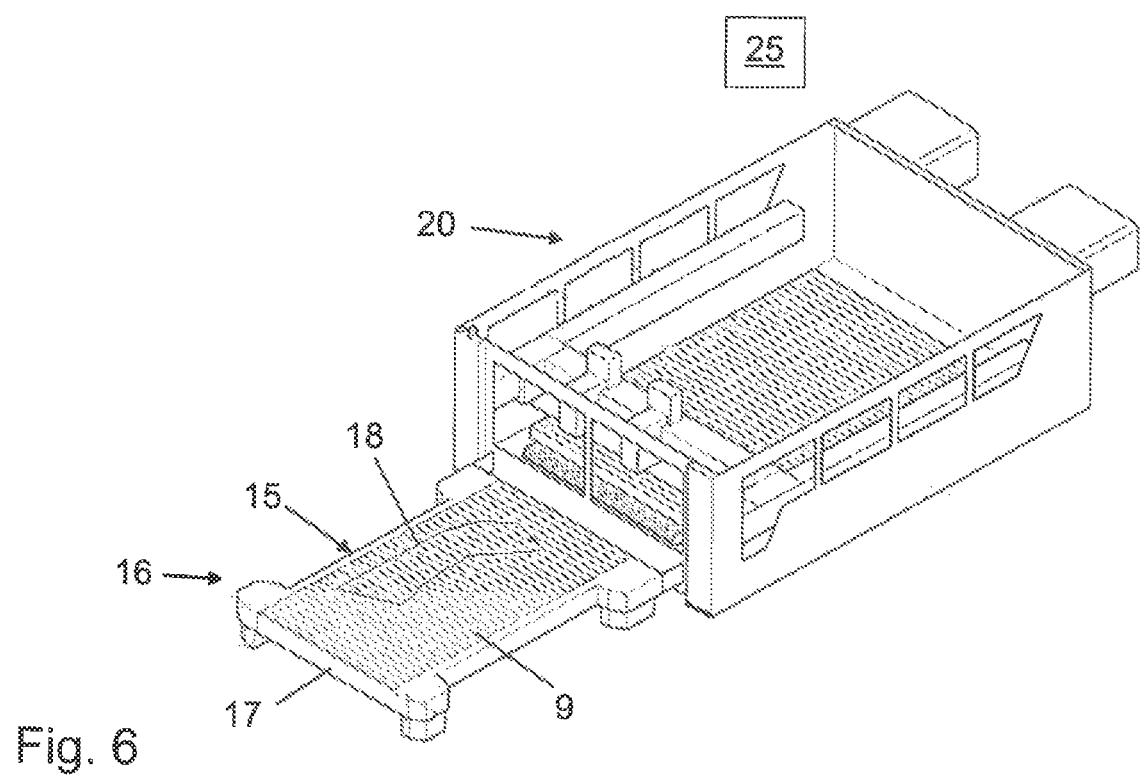
FIG. 6 shows the laser cutting machine according to FIGS. 4 and 5 with a workpiece support produced by the method according to FIGS. 4 and 5 prior to loading with a workpiece to be machined by thermal separation.

The support slat 1 is, together with other support slats 1, part of a workpiece support 15, as shown in FIG. 6 as a pallet on a conventional pallet changer 16.

The support slats 1 are arranged on a bearing structure of the workpiece support 15 designed as a pallet frame 17, at a mutual distance perpendicularly with respect to their longitudinal planes. A recess contour 18 that can be seen in FIG. 6 is formed on the relevant support slats 1 by recesses 7 that are open toward the workpiece side. The position and the shape of the recess contour 18 on the workpiece support 15 display the position and the shape of the separation or cutting path traveled by the laser cutting head 13 or the laser cutting beam 12 during the machining of the metal sheet 11.

Figure 4:
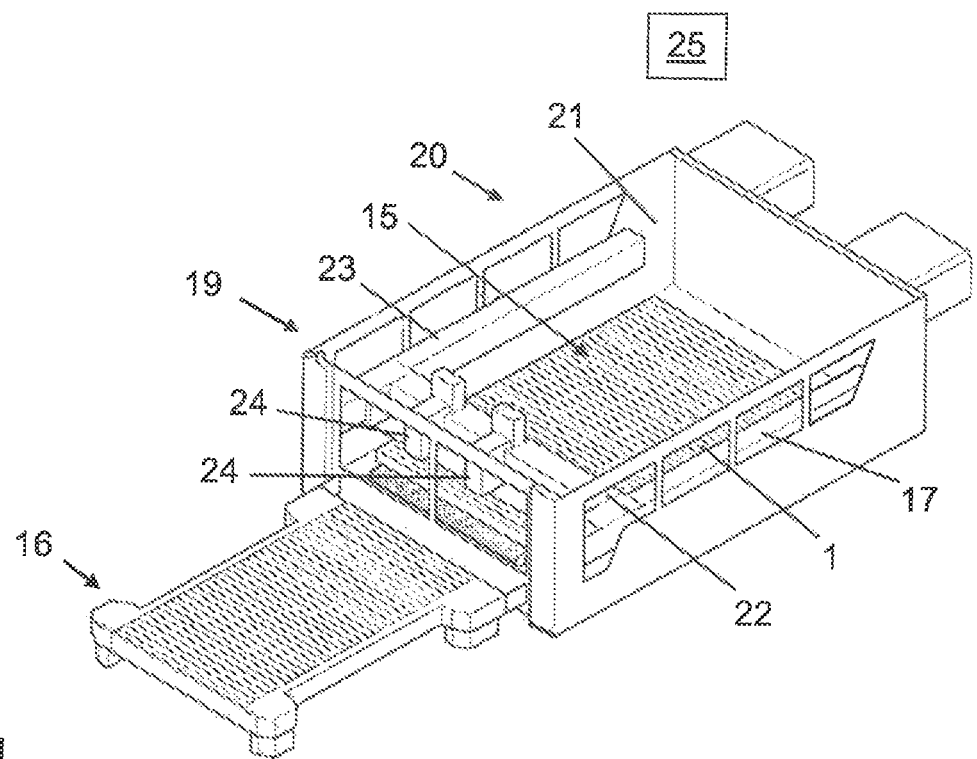
FIGS. 4 and 5 are illustrations to show the production of a workpiece support of a laser cutting machine provided with support slats according to FIGS. 1-3.
Figure 5:
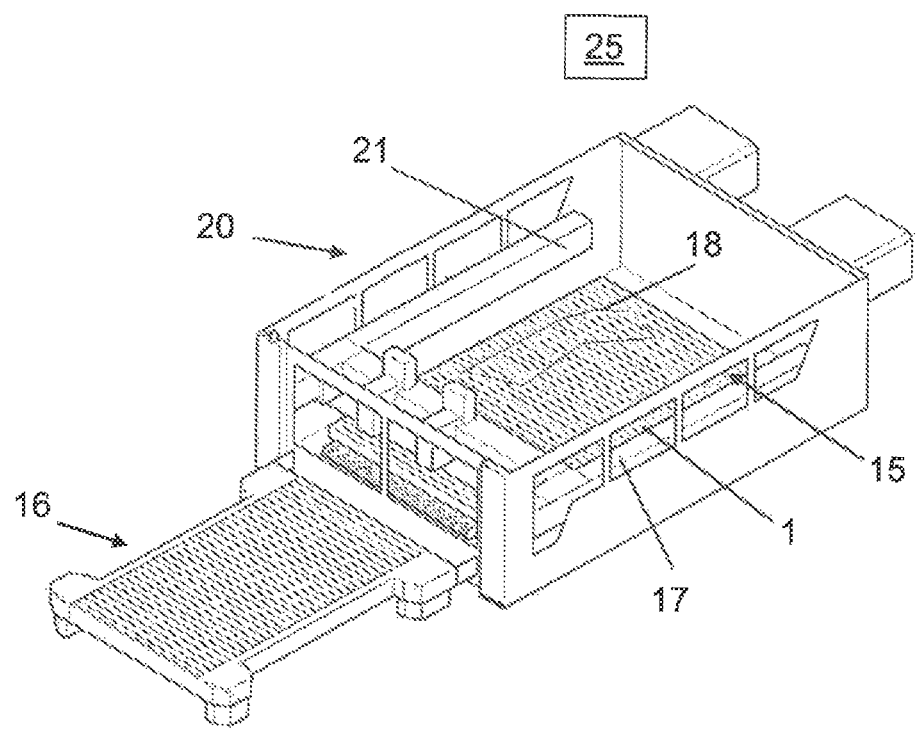

FIGS. 4 and 5 show the production of the workpiece support 15.

The pallet changer 16 is placed near a housing 19 of a conventional laser cutting machine 20 designed as a flatbed machine. In a working space 21 in the interior of the housing 19, a portal cross member 22 is movable along a longitudinal guide 23 in a conventional manner. In the illustrated example, two laser cutting units 24, one of which has the laser cutting head 13 schematically illustrated in FIG. 3, move along the portal cross member 22.

A numerical machine control system 25, indicated in FIGS. 4 to 6, controls all the essential functions of the laser cutting machine 20. In particular, the machining positions, and thus the cutting path along which the laser cutting head 13 moves during the cutting machining of the metal sheet 11 using the laser cutting beam 12, are stored in the numerical machine control system 25.

In FIG. 4, the workpiece support 15, which has not yet been loaded, has entered the working space 21 of the laser cutting machine 20. In this case, the pallet frame 17 is equipped with support slats 1 which are in the initial state according to FIG. 1.

Starting from these conditions, the laser cutting unit 24 provided with the laser cutting head 13 moves on the pallet frame 17 equipped with the support slats 1 in the initial state along the cutting path of the subsequent machining of the metal sheet 11. In this case, movements of the laser cutting head 13 along the portal cross member 22 and movements of the portal cross member 22 along the longitudinal guide 23 are superimposed in a conventional manner.

When moving along the cutting path of the subsequent metal-sheet machining, the laser cutting beam 12 cuts through the connecting webs 8 on those support projections 4 of the support slats 1 in the initial state which support projections are arranged along the cutting path of the subsequent metal-sheet machining. A fixed vertical position of the laser cutting head 13 is adjusted by means of a conventional distance control system, which is used during machining of the metal sheet 11 in order to adjust the distance between the laser nozzle 14 and the metal sheet 11 in the vertical direction. The position of the focus of the laser cutting beam 12 is set, during separative machining of the connecting webs 8 of the support projections 4 to be separated, to a level below the focus position during machining of the sheet 11.

Due to the separative machining of the support slats 1 in the initial state, the recesses 7 arranged below the relevant support projections 4 are opened toward the workpiece side 3 of the support slats 1. The support projections 4 separated from the entity of the support slats 1 are guided away under gravity via the gaps that exist between the support slats 1.

The workpiece support 15 configured for the machining of the metal sheet 11 is produced as a result of the separative machining of the support slats 1 in the initial state by means of the laser cutting beam 12, which workpiece support is shown in FIG. 5 immediately after completion of the separative machining of the relevant support slats 1 inside the working space 21 of the laser cutting machine 20. Support slats 1 of the workpiece support 15, which the laser cutting beam 12 does not approach during machining of the metal sheet 11, have been left in the initial state.

After being manufactured, the workpiece support 15 is moved in a conventional manner from the interior of the working space 21 of the laser cutting machine 20 in front of the housing 19 and into the position in which the workpiece support 15 is shown in FIG. 6.

In the position according to FIG. 6, the workpiece support 15 is loaded with the metal sheet 11 to be machined. Subsequently, the workpiece support 15 loaded with the metal sheet 11 enters the working space 21 of the laser cutting machine 20. The metal sheet 11 is then separatively machined along the cutting path stored in the numerical machine control system 25 and thus also along the recess contour 18 previously produced on the workpiece support 15.

The laser cutting head 13 is used both for producing the workpiece support 15 and for separative machining of the metal sheet 11 supported on the workpiece support 15.

Moreover, the original support slats 1 were already produced by means of the laser cutting head 13. For this purpose, the projection gaps 5 for producing the support projections 4 and also the recesses 7 were cut out in the working space 21 of the laser cutting machine 20 at a corresponding number of workpiece or metal-sheet strips by means of the laser cutting beam 12.

Compared with a machine control system solely for the separative machining of the metal sheet 11, the numerical machine control system 25 is supplemented by programs for producing the support slats 1 and the workpiece support 15.

What is claimed is:

1. A beam machining workpiece support slat for supporting a workpiece during workpiece machining by thermal separation by a separation beam directed onto the workpiece, the support slat comprising:

a slat body; and support projections extending from the slat body at a workpiece side of the support slat, the support projections together defining a workpiece support surface, the support projections spaced along a longitudinal direction of the support slat to form projection gaps therebetween, wherein the support projections are formed integrally with the slat body, wherein the slat body comprises at least one recess on an underside of at least one support projection, the underside of the support projection being a side of the support projection remote from the workpiece side in a transverse direction perpendicular to the workpiece support surface and the recess extending between the underside of the support projection and a wall of the recess, wherein the recess is covered by the support projection towards the workpiece side, and wherein the support projection is separably connected to the slat body and separable from the slat body to open the recess towards the workpiece side.

2. The support slat of claim 1, wherein the support projection is arranged within the recess in a vertical projection in the transverse direction,
wherein the support projection is connected to the slat body via a connecting web provided between the support projection and at least one edge of the recess, and
wherein the support projection is separable from the slat body by separative machining of the connecting web.

3. The support slat of claim 1, wherein the recess widens towards the workpiece side and has at least one recess wall inclined with respect to the transverse direction.

4. The support slat of claim 1, wherein the recess has, in a longitudinal plane spanned by the longitudinal direction and the transverse direction, a triangular shape that widens towards the workpiece side.

5. The support slat of claim 1, wherein one or more of the support projections form a two-dimensional workpiece support on the workpiece side.

6. The support slat of claim 1, wherein the support projections and the projection gaps each have a rectangular shape in a longitudinal plane spanned by the longitudinal direction and the transverse direction.

7. The support slat of claim 1, comprising two layers extending in the longitudinal direction,
wherein a first one of the layers is on the workpiece side and comprises the support projections and the projection gaps, and
wherein a second one of the layers is remote from the workpiece side and arranged on the underside of the support projections and projection gaps and comprises recesses covered by the support projections.

8. The support slat of claim 1, wherein the support slat is formed in one piece and of a uniform material.

9. A beam machining workpiece support for supporting a workpiece during workpiece machining by thermal separation by a separation beam directed onto the workpiece, the workpiece support comprising:
a bearing structure and
a plurality of support slats arranged on the bearing structure and spaced apart from one another perpendicularly to longitudinal planes of the support slats that are spanned by a longitudinal direction of the support slats and a transverse direction of the support slats extending perpendicularly to the longitudinal direction,
wherein at least one of the support slats comprises:
a slat body; and
support projections extending from the slat body at a workpiece side of the support slat, the support projections together defining a workpiece support surface, the support projections spaced along a longitudinal direction of the support slat to form projection gaps therebetween,
wherein the support projections are formed integrally with the slat body, and
wherein the slat body comprises at least one recess that is arranged at a machining position assumed by the separation beam during subsequent workpiece machining, the recess being opened towards the workpiece side of the support slat and extending in the transverse direction of the support slat, towards a side of the support slat remote from the workpiece side, beyond a projection gap that is adjacent to the recess in the longitudinal direction.

* * * * *